United States Patent [19]

Nolan et al.

[11] Patent Number: 4,993,297
[45] Date of Patent: Feb. 19, 1991

[54] SHEARING BLADE MOUNT FOR CUT-OFF DIE SET

[75] Inventors: John H. Nolan, Mt. Clemens; Dennis Skvarce, Wixom, both of Mich.

[73] Assignee: Alpha Industries, Inc., Novi, Mich.

[21] Appl. No.: 563,795

[22] Filed: Aug. 3, 1990

Related U.S. Application Data

[63] Continuation of Ser. No. 255,315, Oct. 11, 1988, abandoned.

[51] Int. Cl.⁵ .............................................. B26D 7/26
[52] U.S. Cl. ...................................... 83/698; 83/318; 269/231
[58] Field of Search ................... 83/54, 300, 318, 319, 83/320, 382, 698, 916, 917, 926 G; 269/231, 235

[56] References Cited

U.S. PATENT DOCUMENTS 2,304,771 12/1942 Davis ..................................... 83/700
4,294,147 10/1981 Borzym ................................. 83/319
4,766,792 8/1988 Borzym et al. ....................... 83/319
4,872,384 10/1989 Borzym ................................. 83/454

Primary Examiner—Hien H. Phan
Assistant Examiner—Scott A. Smith
Attorney, Agent, or Firm—Krass & Young

[57] ABSTRACT

A shearing blade assembly specifically for use in a double cut die set of the type used to cut tubing continuously emanating from a tube mill. The present invention is directed toward the shearing blade assembly used in conjunction with the notching blade of the cut-off die set. The subject device includes a mounting block fixed to the upper platen of a die set, a shearing blade mounted to a shearing blade cartridge. The shearing blade cartridge is then inserted into the mounting block and is retained in position by a cam lock assembly. The cam lock assembly and cartridge system allows the shearing blade to be quickly and efficiently removed and replaced as needed.

7 Claims, 4 Drawing Sheets

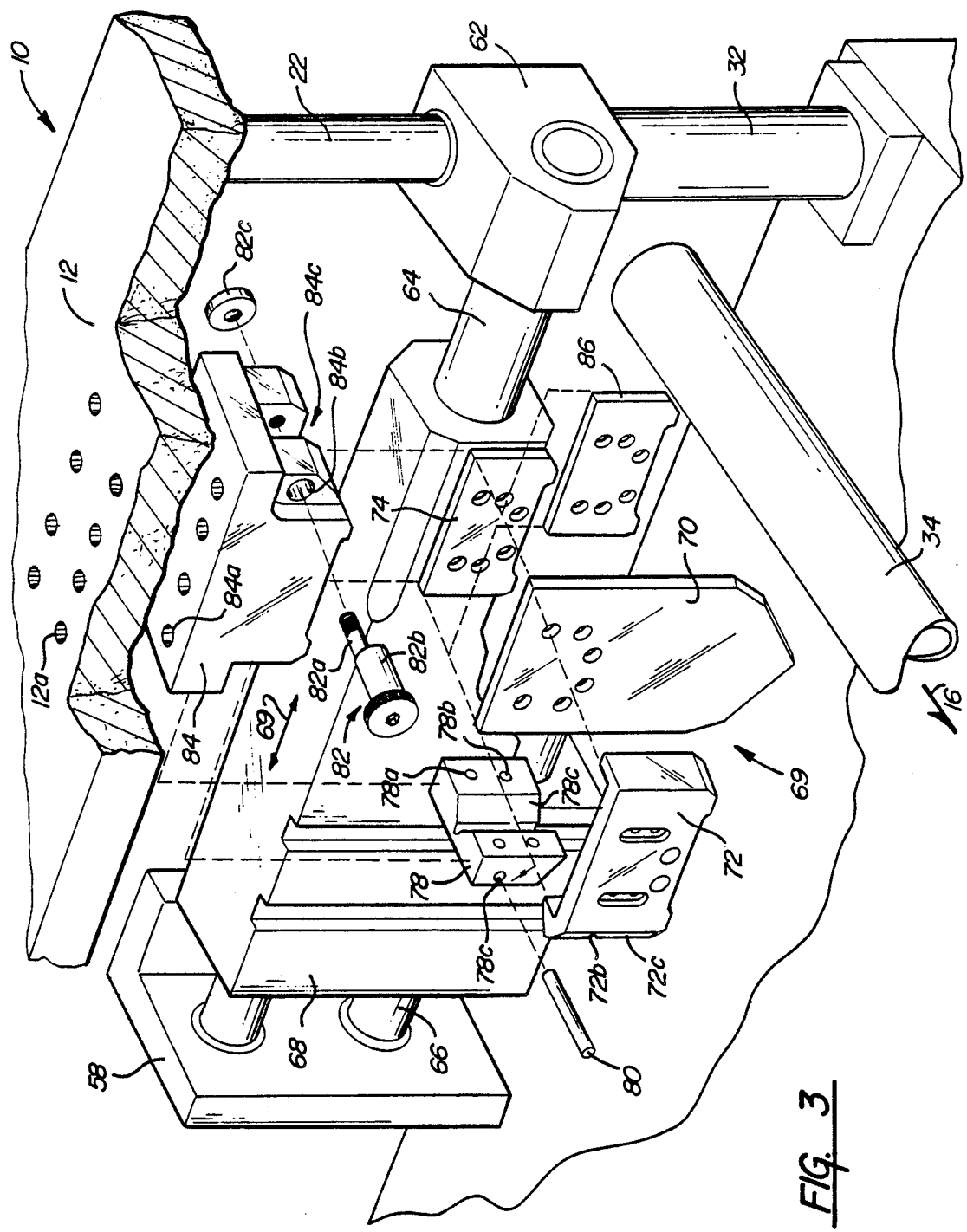

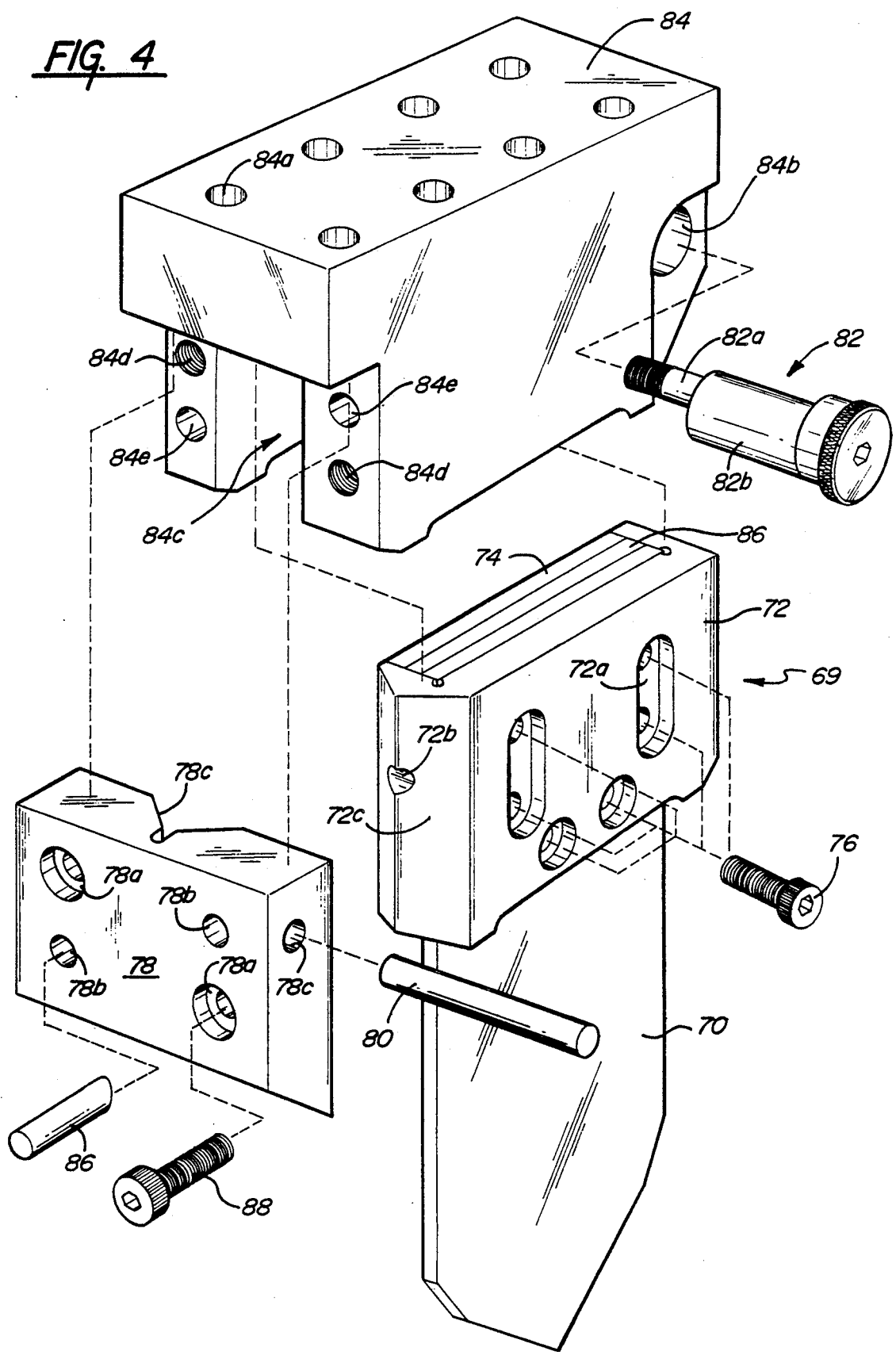

SHEARING BLADE MOUNT FOR CUT-OFF DIE SET

This is a continuation of co-pending application Ser. No. 255,315 filed on Oct. 11, 1988, now abandoned.

INTRODUCTION

This invention relates to a cut die set of the type used in combination with a press to cut tubing and fabricated shapes as they are fabricated. More specifically, the present invention is directed toward improvements in the shearing blade assembly of a die set which facilitate the installation and replacement of the shearing blade.

BACKGROUND OF THE INVENTION

In a cut-off die set, a shearing blade is used to shear a continuous length of tubing emanating from a tube mill into useful and manageable sections. The shearing apparatus typically comprises a shearing blade fixed or mounted to an upper platen which is mounted on pins for movement relative to a lower platen. As the die set is closed, the shearing blade severs the tubing into predetermined lengths. Both single and double cut die sets are known.

Presently the upper end of the shearing blade is clamped to a blade mounting block fixed to the upper platen of the die set by machine screws. The blade is contained in a recess on the face of the mounting block. Spacers of various thicknesses are disposed between the blade and the mounting block. The spacers are used to align the shearing blade. A clamping plate is used to fasten the shearing blade to the blade mounting block. The clamping plate is fixed to the blade mounting block by threaded fasteners extending through both the clamping plate and shearing blade. The threaded fasteners are received in threaded bores located on the mounting block.

Eventually the cutting surface of the shearing blade becomes dull during the cutting operation. When dull, the shearing blade must be sharpened or replaced in order for the die set to continue operatiing at maximum efficiency. Changing the shearing blade is a time consuming procedure. The operator is required to loosen and remove the clamping plate and screws fastening the blade to the mounting block. When the clamping plate is removed the operator must remove the old blade and insert a new blade in the proper position on the mounting block. Finally the operator must replace the clamping plate and re-tighten the screws thereby fastening the new blade to the mounting block.

The operator must also follow the same time consuming procedure when changing the blade to accommodate different sizes of tubing or when the blade is broken during the cutting operation. Any time savings that can gained while changing the shearing blade results in increased operation time of the mill. As indicated, time is of the essence in the tube cutting industry, tubing continuously emanates from a tube mill at a high rate of speed. Thus, any problems, delays or shutdowns due to repair or replacement of the cutting equipment results in lost production and revenue to the tube maker. Therefore, any time savings that results from ease in maintenance and/or replacement of parts increases the period the mill can be operational, thus increasing production.

SUMMARY OF THE INVENTION

The present invention is directed to the provision of an improved mounting means for the shearing blade of a cut-off die set. According to the invention, a mounting block is fixed to one of the platens of the die set, a shearing blade is mounted in a shearing blade cartridge, and the cartridge assembly is then retained in the mounting block.

In the preferred form this arrangement allows the shearing blade and shearing blade cartridge assembly to be inserted in the mounting block fixed to a platen of the double cut die set. A retaining means allows the shearing blade and blade cartridge combination to be releasably retained in the mounting block.

Another aspect of the invention includes a clamping plate for fixing the shearing blade to the shearing blade cartridge. A spacer plate is further included to properly position the shearing blade within the shearing blade cartridge. This aspect allows different width blades to be inserted in the blade cartridge, thus allowing the use of a single blade cartridge for retaining different blade sizes.

Another aspect of the invention includes a retaining means comprising a gib fixed to the mounting block. Also fixed to the mounting block is a cam lock assembly for urging the shearing blade cartridge against the gib. In the preferred form, the shearing blade cartridge is inserted in the mounting block and placed against the gib. The cam lock assembly is then rotated to urge the blade cartridge against the gib fixing the blade cartridge in position in the mounting block. The cam lock assembly includes a shaft mounted to the mounting block having an eccentric fixed to the shaft for rotatably engaging the shearing blade cartridge. The cam lock assembly also has a means for fixing the shaft in position once the eccentric has been set against the shearing blade cartridge.

A further aspect of the invention includes a retaining member located on the bearing surface of the gib acting in combination with a complementary notch located on the bearing surface of the blade cartridge to further fix the blade cartridge in position.

BRIEF DESCRIPTION OF THE DRAWING

FIG. 3 is an exploded perspective view of the shearing blade mounting structure; and FIG. 4 is another exploded perspective view of the means for mounting the shearing blade cartridge mounting block.

DETAILED DESCRIPTION OF THE PREFERRED EMBODIMENT

Figure 1:
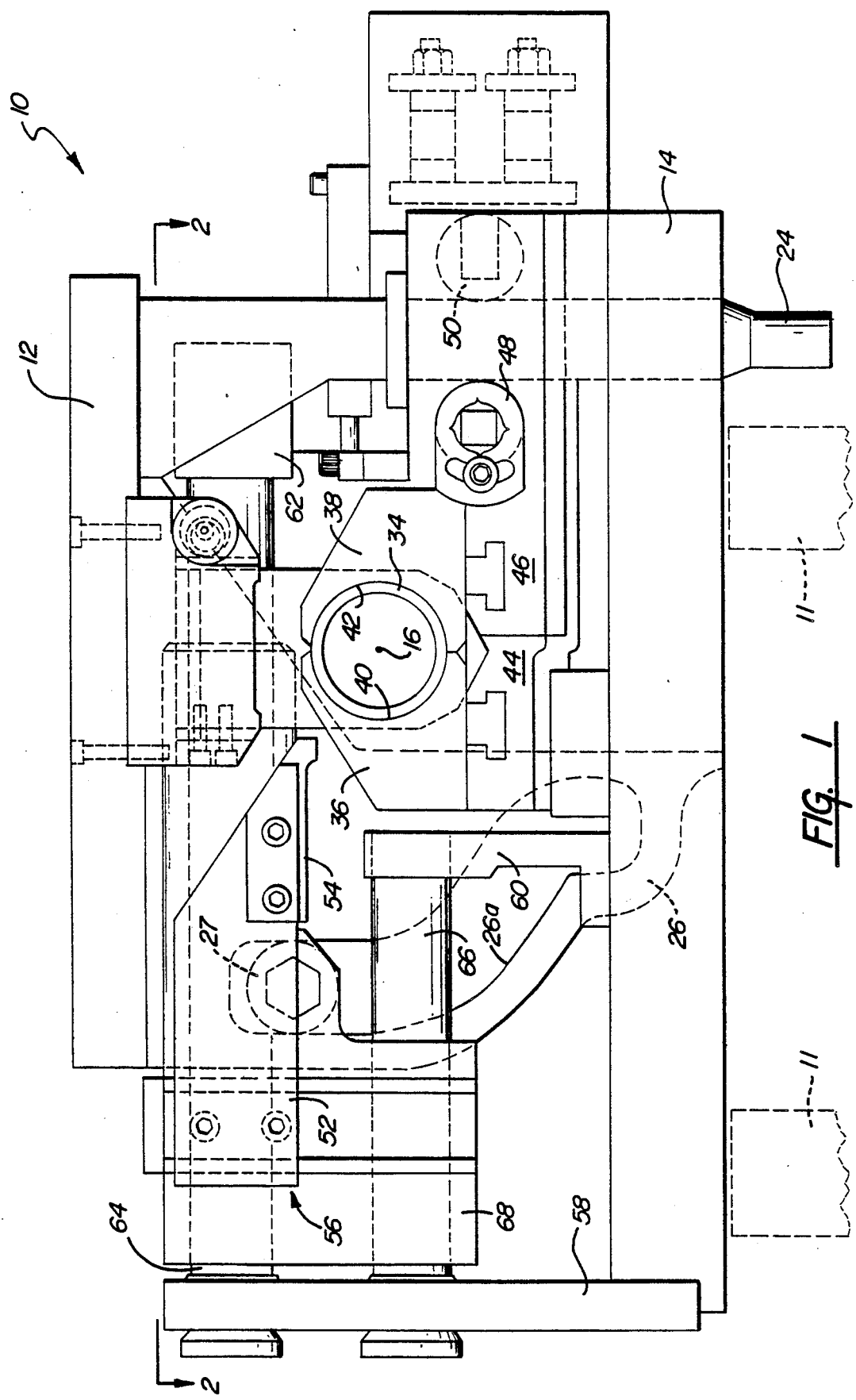
FIG. 1 is an end view of a cut-off die set according to the invention.
Figure 2:
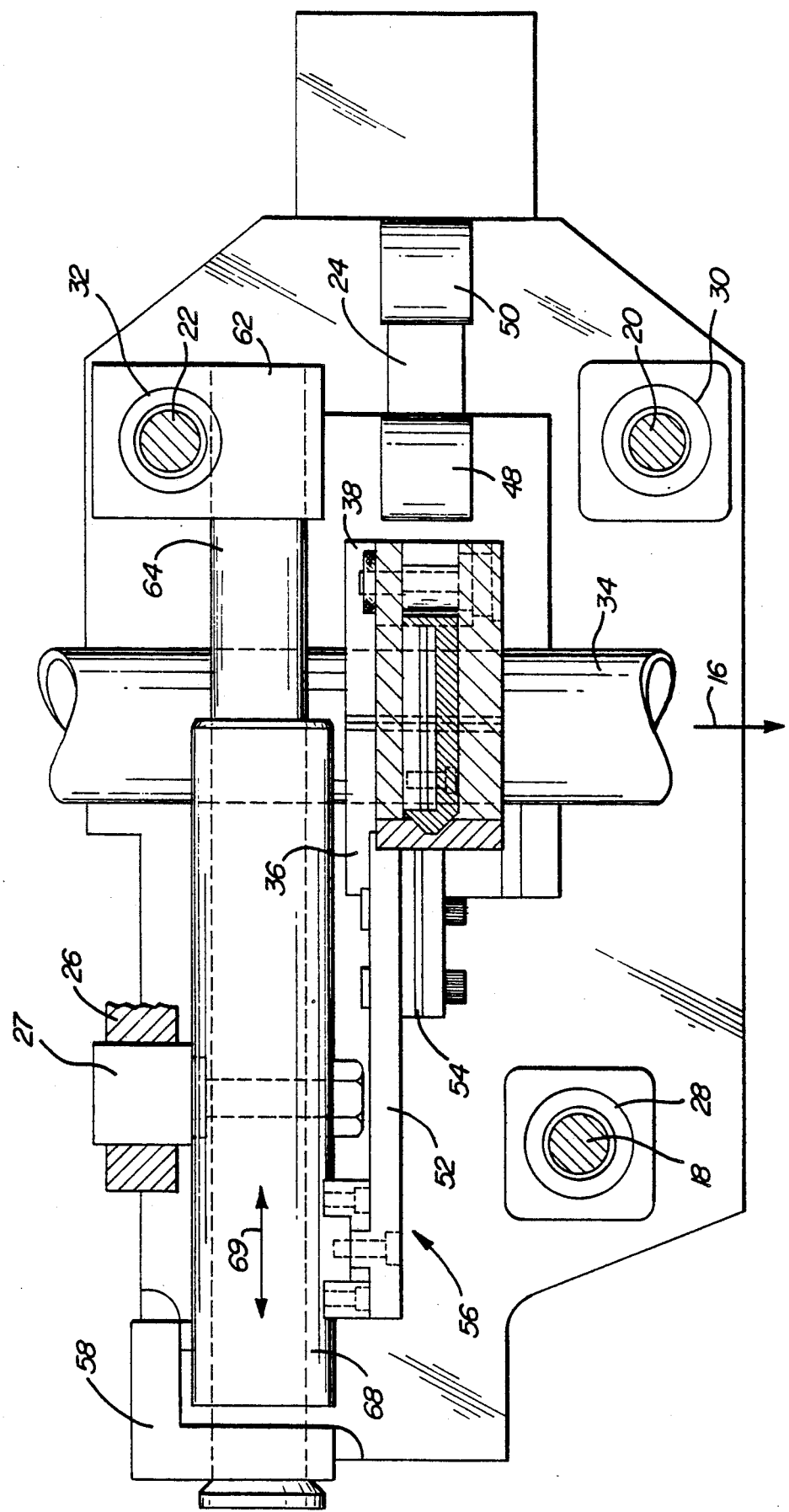
FIG. 2 is a section view of the die set taken along section line 2—2.

The illustrated cut-off die set 10 is adapted to be employed in a tube cutting press (not shown) and is slidably movable along a set of rails 11 which are part of the press base. The press includes a swinging or reciprocating ram mechanism (not shown) which bears against an upper platen 12 and serves to operate the cut-off die set 10. In die sets of the general type with which the present invention is concerned, the cut-off die set is positioned to receive the tubing as it emanates from the fabrication mill and the ram mechanism operates to cause the clamping jaws within the die set to clamp the die set to the rapidly moving tubing. The die set, clamped to the moving tube, moves together with the tube along the rails 11. The ram mechanism then causes the notching blade to make a notching cut in the upper periphery of the tubing whereafter the shearing blade is lowered to sever a length from the moving tube. Following the final severing cut, the ram mechanism, then operating in a reverse manner, first causes retraction of the shearing blade and the notching blade and then unclamping of the die set from the tube section as the cut-off die set approaches the end of its travel on the rails 11. The cut-off die set is then returned to its initial position on the rails set 11 preparatory to initiation of a new cut-off cycle. This description of a flying, double cut operation notwithstanding, the invention is also useful in stationary cut and single cut applications.

Cut-off die set 10 includes an upper platen 12 and a lower platen 14.

Upper platen 12 overlies the tube path 16 and includes three guide rods 18, 20 and 22 extending downwardly from spaced locations on the underside of platen 12. Guide rod 18 is positioned on the left-hand or near side of tube path 16 and guide rods 20 and 22 are positioned at the front and rear of the cut-off die set respectively on the right-hand or remote side of tube path 16. A die jaw cam 24 extends downwardly from upper platen 12 generally between guide rods 20 and 22 and a cam guide 26 extends downwardly from upper platen 12 adjacent the rear edge thereof and on the near or left-hand side of tube path 16.

A plurality of guide sleeves or bushings 28, 30 and 32 upstand from lower platen 14 and respectively telescopically receive the lower ends of guide rods 18, 20 and 22 so as to guide upper platen 12 in reciprocal movement relative to lower platen 14 during the tube severing operation.

The tubing 34 emanating from the tube forming mill is clamped to the die set 10 by means of two pairs of die jaws 36 and 38 each having a complementary inner radius contour 40 and 42, conforming to the tube contour. The reciprocal clamping and disengaging movement of die jaws 36 and 38 is produced by sliding movement of an upper die jaw holder 44 and a lower die jaw holder 46 slidable on each other. The die clamping jaws 36 and 38 are adapted to be reciprocated towards and away from each other in synchronism with the movement of the upper platen relative to the lower platen by coaction of die jaw cam 24 passing between a pair of clamping rollers 48 and 50 carried respectively by the upper die jaw holder 44 and lower die jaw holder 46. The manner in which the cam 24 coacts with the rollers 48 and 50 to move the die jaws 36 and 38 into and out of clamping engagement with tube 34 will not be further described since this mechanism is known and is not part of the present invention. Further details of a mechanism of this type may be found in U.S. Pat. Nos. 4,108,029 and 4,294,147, both assigned to the assignee of the subject application, disclosures of which are incorporated herein by reference.

A notching assembly seen generally at 56, having a notching blade holder 52 and a notching blade 54 operates to provide a notching cut in the upper periphery of the tube prior to the downward severing movement of the shearing blade. The notching cut precludes the necessity of further working of the severed tube section following the severing operation. Both thrust and "pull across" notching assemblies are known; see, for example U.S. Pat. Nos. 4,109,555 and 4,294,147, respectively, disclosures of which are herein incorporated by reference.

Notching assembly 56 is supported on a cross slide assembly 68 comprising a support bracket 58, a support bracket 60, a support bracket 62, an upper guide shaft 64 and a lower guide shaft 66. A cam follower 27 is fixed to the cross slide 68 and follows cam guide 26 having a curvilinear cam track 26a. Movement of the upper platen 12 causes the cam guide 26 to impart reciprocal motion 69 to the cross slide 68. Further details of a cross slide mechanism of this type may be found in U.S. Pat. No. 4,766,792, assigned to the assignee of the subject application, disclosure of which is herein incorporated by reference.

FIGS. 3 and 4 illustrate the shearing blade assembly in the preferred form. A mounting block 84 is fixed to the upper platen 12 of the die set 10. Threaded fasteners extending through bores 12a are threadably received in bores 84a located on the mounting block 84. While threaded fasteners are herein used to fix mounting block 84 to upper platen 12, other fastening means such as riveting, welding, or brazing could be used to fix mounting block to upper platen 12. If so desired, block 84 could be formed as an integral part of platen 12. Mounting block 84 has a slot 84c existing normal to the tube path 16 slot 84c is of sufficient size to receive the shearing blade cartridge assembly 69.

The shearing blade 70 is mounted within the shearing blade cartridge 72 by means of threaded fasteners 76 extending through transverse bores 72a and threadably received in the clamping plate 74. Although threaded fasteners are used herein, other fastening means could also be used to fix the shearing blade 70 to the blade cartridge 72, such as rivets, welds or brazing. If desired, the total blade cartridge could be integrally formed, thus eliminating the use for any type of fastening means. The shearing blade 70 is made of a high speed steel having a sharpened cutting surface opposite the blade cartridge.

A change in the size or the wall thickness of the tubing 34 being cut necessitates that different sizes of shearing blade to be used to properly sever the tubing 34. A spacer plate 86 is used in combination with the clamping plate 74 to properly retain the shearing blade 70 in the blade cartridge 72. The spacer plate 86 allows a standard size blade cartridge 72 to be used with different sizes of shearing blade 70. Obviously when changing the width and/or thickness of the shearing blade, different shapes, sizes or combinations of spacer plates 86 are needed to fix the shearing blade 70 in the proper position on the shearing blade cartridge 72.

The blade cartridge 72 is held in position in the mounting block 84 by means of a V-shaped gib 78 fixed to the mounting block 84. A cam lock assembly 82 is used to urge the blade cartridge 72 against the gib 78. The blade cartridge 72 has a corresponding V-shaped projection 72c adapted to be received in the complementary V-shaped notch 78c existing on the gib 78. The gib 78 is fixedly mounted to the mounting block 84 by means of threaded fasteners 88 extending through transverse bores 78a and threadably received in threaded bores 84d located on mounting block 84. The gib 78 is also aligned and fixed to mounting block 84 by means of dowel pins 86 extending through transverse bores 78b and received in bores 84e located on mounting block 84.

A dowel pin 80 extends through bore 78c existing on gib 78. The dowel pin 80 forms a projection which is received in a complementary notch 72b located on the V-shaped bearing surface 72c of the blade cartridge 72. When the blade cartridge 72 is fixed in the cutting position, the combination of dowel pin 80 and notch 72b act to prevent the blade from being pulled out of the mounting block should the blade encounter any obstructions or binding action when the die set is being operated in the reciprocal manner, i.e. when the shearing blade is being retracted after severing the tubing.

The cam lock assembly 82 used to urge the V-shaped projection 72c of the blade cartridge into the V-shaped notch 78c of the gib 78 includes a shaft 82a extending through a transverse bore 84b located on mounting block 84. The cam lock assembly further includes an eccentric 82b fixed to the shaft 82a. The cam lock assembly is locked in the fixed position by a nut 82c adapted to be received on the threaded portion of the shaft 82a.

The preferred embodiment allows the shearing blade 70 to be mounted in the blade cartridge 72, thus forming a shearing blade and cartridge assembly 69. The shearing blade cartridge assembly 69 is then inserted into the mounting block 84 engaging the bearing surface 72c against the complementary bearing surface of the gib 78c, further engaging notch 72b with dowel pin 80. The cam lock assembly 82 is then rotated to lock the cartridge assembly 69 in a fixed position. When the blade cartridge assembly 69 needs to be removed, the operator need only loosen the cam lock assembly 82 enabling the operator to remove the blade cartridge assembly 69 from the mounting block 84.

The described mounting arrangement for the shearing blade will be seen to provide a firm positive support for the blade throughout its reciprocal motion used in accomplishing the shearing stroke. Specifically, the described support mechanism for the shearing blade allows the shearing blade to be quickly and efficiently removed and replaced in the mounting block.

Although a preferred embodiment of the invention has been illustrated and described in detail, it will be apparent that various changes may be made in the disclosed embodiment without departing from the scope or spirit of the invention. Moreover, the terms "vertical" and "horizontal" are used herein in a relative sense and do not suggest any given orientation of the mechanism described and placed into actual use.

What is claimed is:

1. A shearing blade assembly for use in mounting a shearing blade to a platen of a cut-off die set comprising:
    a platen;
    a mounting block, including a top portion and two separate, flat plate portions extending downwardly therefrom, fixed to the platen;
    a shearing blade;
    a shearing blade cartridge;
    first means for mounting the shearing blade in the shearing blade cartridge; and
    second means provided on said first and second plate portions for retaining the shearing blade cartridge in the socket of the mounting block.

2. A shearing blade assembly as defined in claim 1 wherein said first means comprises:
    a clamping plate for fixing the shearing blade to the shearing blade cartridge; and
    means for fastening the clamping plate to the shearing blade cartridge.

3. A shearing blade assembly as defined in claim 2 further including a spacer plate for positioning the shearing blade in the proper position within the cartridge.

4. A shearing blade assembly as defined in claim 3 wherein said second means comprises:
    a gib fixed to the mounting block; and
    a cam lock assembly fixed to the mounting block for urging the shearing blade cartridge against said gib.

5. The shearing blade assembly as defined in claim 4 wherein said cam lock assembly comprises:
    a shaft mounted to the mounting block;
    an eccentric fixed to the shaft; and
    a means for fixing a shaft in a set position.

6. A shearing blade assembly as defined in claim 5 wherein said second means further includes:
    a retaining member located on the bearing surface of the gib; and
    said blade cartridge having a notch located on the complementary bearing surface of the cartridge for engaging said retaining member.

7. A shearing blade mount for a cut-off die set comprising:
    a mounting block adapted for mounting to a die set platen and having first and second parallel, depending plate portions separated by a downward-opening gap;
    a gib plate mounted to the mounting block on one side thereof and having an internal V-shaped guideway formed therein which is aligned with and contiguous to said gap;
    a shearing blade cartridge including a back plate and a clamp plate adapted to sandwich a shearing blade therebetween, one of said plates having an external V-shaped guide portion which fits slidably into the internal V-shaped guideway of the gib plate; and
    rotary eccentric cam means mounted in said mounting block to selectively contact an edge of the shearing blade cartridge opposite the external guide portion to urge the guide portion into the guideway.

* * * * *